US012255001B2

(12) United States Patent
van Besouw et al.

(10) Patent No.: US 12,255,001 B2
(45) **Date of Patent: *Mar. 18, 2025**

(54) DEADFRONT ARRESTER WITH DISCONNECTOR DEVICE

(71) Applicant: Hubbell Incorporated, Shelton, CT (US)

(72) Inventors: Bastiaan Hubertus van Besouw, Strongsville, OH (US); David Charles Hughes, Aiken, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,143

(22) Filed: Aug. 7, 2023

(65) Prior Publication Data

US 2023/0377782 A1 Nov. 23, 2023

Related U.S. Application Data

(63) Continuation of application No. 17/824,401, filed on May 25, 2022, now Pat. No. 11,721,457, which is a continuation of application No. 17/127,820, filed on Dec. 18, 2020, now Pat. No. 11,367,547.

(60) Provisional application No. 62/951,590, filed on Dec. 20, 2019.

(51) Int. Cl.

| | |
|---|---|
| ***H01C 7/12*** | (2006.01) |
| ***H01C 1/02*** | (2006.01) |
| ***H01H 39/00*** | (2006.01) |

(52) U.S. Cl.

CPC ................. *H01C 7/12* (2013.01); *H01C 1/02* (2013.01); *H01H 39/006* (2013.01)

(58) Field of Classification Search

CPC ........... H01C 7/12; H01C 1/02; H01H 39/006

See application file for complete search history.

(56) References Cited

U.S. PATENT DOCUMENTS

| | | | |
|---|---|---|---|
| 4,734,823 | A | 3/1988 | Cunningham |
| 5,088,001 | A | 2/1992 | Yaworski |
| 5,237,482 | A | 8/1993 | Osterhout |

(Continued)

FOREIGN PATENT DOCUMENTS

| | | | |
|---|---|---|---|
| EP | 3 293 839 | A2 | 3/2018 |
| EP | 3 293 839 | A3 | 4/2018 |

(Continued)

OTHER PUBLICATIONS

Extended European Search Report dated Dec. 13, 2023 for corresponding European Application No. 20902550.1, pp. 1-10.

(Continued)

*Primary Examiner* — Kyung S Lee

(74) *Attorney, Agent, or Firm* — Michael Best & Friedrich LLP

(57) ABSTRACT

Systems for disconnecting a surge arrester. One embodiment provides a surge arrester comprising a housing, a connecting interface configured to connect to an electrical power grid, and a disconnector device coupled to the connecting interface. A metal oxide varistor stack is coupled to the disconnector device, and a ground side connection is coupled to the metal oxide varistor stack, the ground side connection configured to connect to a system ground. The disconnector device is configured to disconnect the connecting interface from the system ground based on a predetermined disconnection condition.

20 Claims, 6 Drawing Sheets

(56) References Cited

U.S. PATENT DOCUMENTS

| | | | |
|---|---|---|---|
| 5,434,550 | A | 7/1995 | Putt |
| 5,991,141 | A | 11/1999 | Mikli et al. |
| 6,667,871 | B2 | 12/2003 | Berlovan |
| 11,367,547 | B2 | 6/2022 | van Besouw |
| 2007/0297114 | A1 | 12/2007 | Woodworth et al. |
| 2008/0068122 | A1 | 3/2008 | Lenk et al. |
| 2008/0297327 | A1 | 12/2008 | Zitting et al. |
| 2009/0109592 | A1 | 4/2009 | Woodworth et al. |
| 2010/0051437 | A1 | 3/2010 | Kruska et al. |
| 2015/0364281 | A1 | 12/2015 | Depping et al. |
| 2018/0076617 | A1 | 3/2018 | Boese et al. |

FOREIGN PATENT DOCUMENTS

| | | | |
|---|---|---|---|
| WO | 93/01641 | A1 | 1/1993 |
| WO | 2009/055768 | A1 | 4/2009 |

OTHER PUBLICATIONS

PCT/US2020/066232 International Search Report and Written Opinion dated Mar. 15, 2021. (12 pages).
Chinese Patent Application No. 202080097365.4 First Office Action Issued by the China National Intellectual Property Administration dated Jul. 31, 2024 (and translation).

DEADFRONT ARRESTER WITH DISCONNECTOR DEVICE

CROSS REFERENCE TO RELATED APPLICATIONS

This application is a continuation of U.S. patent application Ser. No. 17/824,401, filed May 25, 2022, which is a continuation of U.S. patent application Ser. No. 17/127,820, filed Dec. 18, 2020, which claims the benefit of U.S. Provisional Patent Application No. 62/951,590, filed Dec. 20, 2019, the entire content of which is hereby incorporated by reference.

FIELD

The present disclosure relates to overvoltage protection assemblies, and more specifically, to disconnector devices within overvoltage protection assemblies. Disconnector devices are typically used to disconnect a failed or failing surge arrester from the system.

SUMMARY

Electrical grids commonly incorporate protective devices, such as surge arresters or dead front arresters, to protect associated equipment from power surges. Power surges can result from events such as lightning electrical switching events, as well as others. Deadfront arresters include an outer layer made of a conductive material that is connected to a ground potential; this ensures the arrester is safe when installed. These protectives devices may incorporate fail-safes such as disconnector devices that isolate the protective device from the electrical grid during certain events, such as a surge arrester failing and creating an undesirable low impedance fault. Surge arrester failures may be dangerous occurrences because hot gasses, plasma, and electrical arcs are often expelled from the device. The connection between the ground potential and the outside layer may be maintained before, during, and after operation of the disconnector device to maintain safety.

The current disclosure provides for a device that disconnects a surge arrester from electrical ground prior to failure of the surge arrester. The device operates based on a disconnect condition and disconnects the arrester from ground. When the associated disconnect condition is satisfied, for example, the occurrence of a predetermined leakage current through the surge arrester, the device performs an action, either independently or in concert with other devices, to break the electrical connection.

In one embodiment, a surge arrester comprises a housing, a connecting interface configured to connect to an electrical power grid, and a disconnector device coupled to the connecting interface. A metal oxide varistor (MOV) stack is coupled to the disconnector device, and a ground side connection is coupled to the metal oxide varistor stack, the ground side connection configured to connect to a system ground. The disconnector device is configured to disconnect the connecting interface from the system ground based on a predetermined disconnection condition.

In another embodiment, a surge arrester comprises a housing, a connecting interface configured to connect to an electrical power grid, and a metal oxide varistor stack coupled to the connecting interface. The surge arrester further includes a disconnector device coupled to the metal oxide varistor stack, and a ground side connection coupled to the disconnector device, the ground side connection configured to connect to a system ground. The disconnector device is configured to disconnect the connecting interface from the system ground based on a predetermined disconnection condition.

In another embodiment, a surge arrester comprises a housing, a connecting interface configured to connect to an electrical power grid, and a metal oxide varistor stack coupled to the connecting interface. The surge arrester further includes a ground side connection coupled to the metal oxide varistor stack, and a disconnector device coupled to the ground side connection, the disconnector device configured to connect to a system ground. The disconnector device is configured to disconnect the connecting interface from the system ground based on a predetermined disconnection condition.

Other aspects of the application will become apparent by consideration of the detailed description and accompanying drawings.

DETAILED DESCRIPTION

Before any embodiments of the application are explained in detail, it is to be understood that the application, and the devices and method described herein, are not limited in their application to the details of construction and the arrangement of components set forth in the following description or illustrated in the following drawings. The devices and methods in this application are capable of other embodiments and of being practiced or of being carried out in various ways.

Figure 1A:
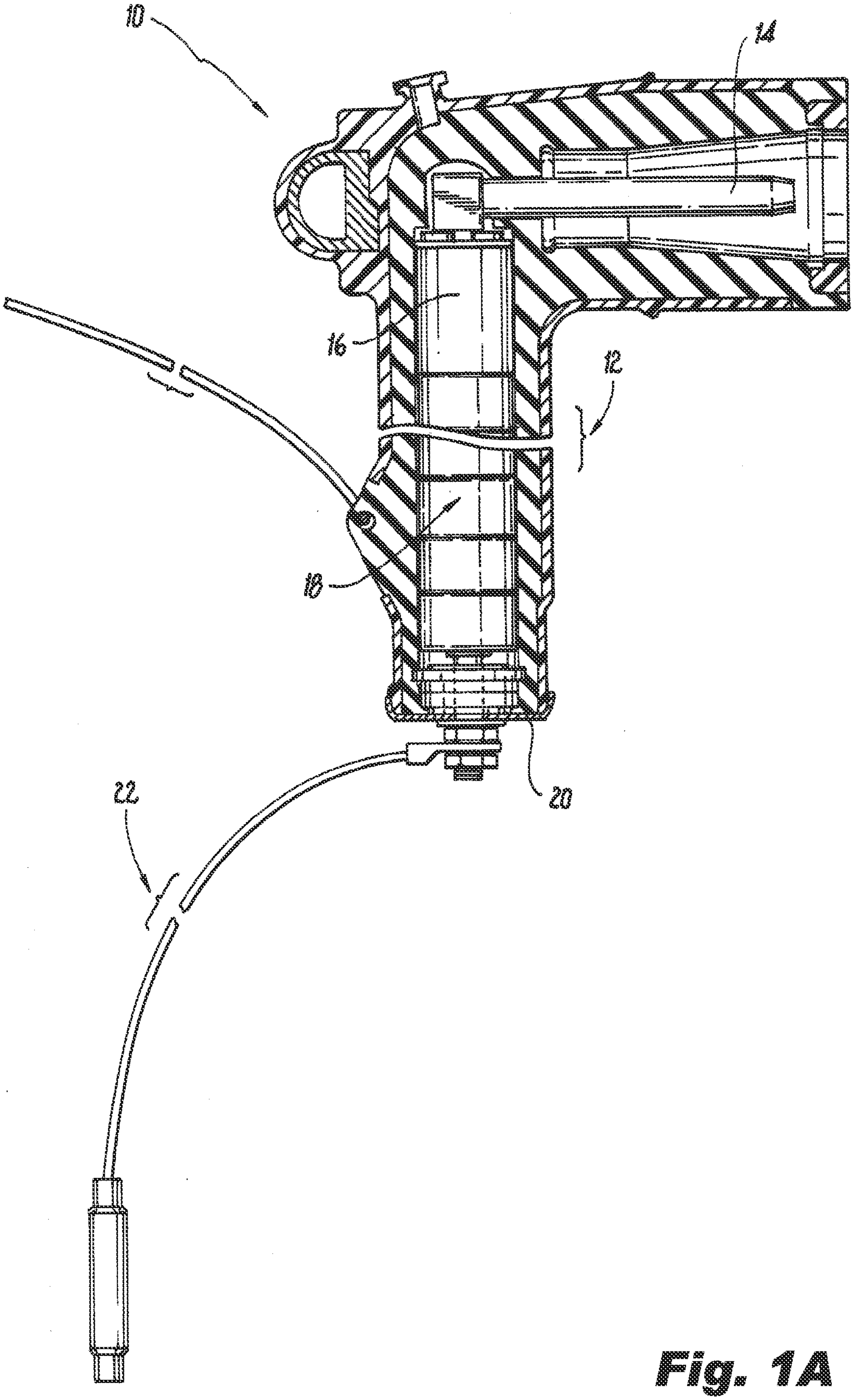
FIG. 1A illustrates a cross-sectional side view of a surge arrester according to some embodiments.

FIG. 1A illustrates a surge arrester 10 (e.g., a deadfront arrester, an elbow arrester, a lightening arrester, a tee arrester, a bushing arrester, a parking stand arrester, a 200A deadbreak arrester, a 600A loadbreak arrester, or the like) according to some embodiments of the application. The surge arrester 10 includes a housing 12 that houses a terminal 14 (e.g., a connecting interface), a disconnector device 16, a metal oxide varistor (MOV) stack 18, and a bottom ground side connection 20. The bottom ground side connection 20 is coupled to a system ground 22 to form a complete electrical connection from the terminal 14 to the system ground 22. The housing 12 may be composed of an insulating material with a conductive layer to protect external equipment and workers from high voltages that may be present within the surge arrester 10 and provide a deadfront situation. The terminal 14 is configured to couple to an electrical cable of an electrical grid system, such as an underground power system. In some embodiments, this power system may be, for example, a 15 kV, 25 kV, 28 kV, or 35 kV underground system.

The MOV stack 18 is coupled between the disconnector device 16 and the bottom ground side connection 20 and has a resistance that changes based on the voltage of the surge arrester 10 (e.g., the voltage received by the terminal 14). At a normal operating voltage, the MOV stack 18 has a high resistance and restricts current from flowing through the surge arrester 10. In the case of a power surge (e.g., a voltage increase), the resistance of the MOV stack 18 decreases and allows current to flow through the surge arrester 10 to the system ground 22. If the power surge exceeds the capabilities of the surge arrester 10, the MOV stack 18 releases heat and, as the power surge continues for a period of time, the MOV stack 18 may continue to release dangerous hot gas and melt or vaporize through the bottom ground side connection 20.

The disconnector device 16 is coupled between the terminal 14 and the MOV stack 18 and disconnects the surge arrester 10 from the ground connection prior to a failure of the MOV stack 18. For example, when the voltage experienced by the surge arrester 10 increases, the MOV stack 18 experiences an increase in current. When this current reaches a predetermined current threshold (e.g., predetermined leakage current), the disconnector device 16 performs an operating function that disconnects the surge arrester 10 from the system ground 22, stopping current flow through the surge arrester 10.

The operating function may also be an action that breaks or disables a component of the disconnector device 16. For example, the disconnector device 16 may include a cartridge containing gunpowder. When high voltage or high current are sustained, the gunpowder within the cartridge is ignited, causing an explosion that forces the disconnector device 16 to separate from the housing 12. This action also separates any components of the surge arrester 10 coupled below the disconnector device 16 from the housing 12. Alternatively, the gunpowder may ignite based on a leakage current through the arrester exceeding a safe amount.

Figure 1B:
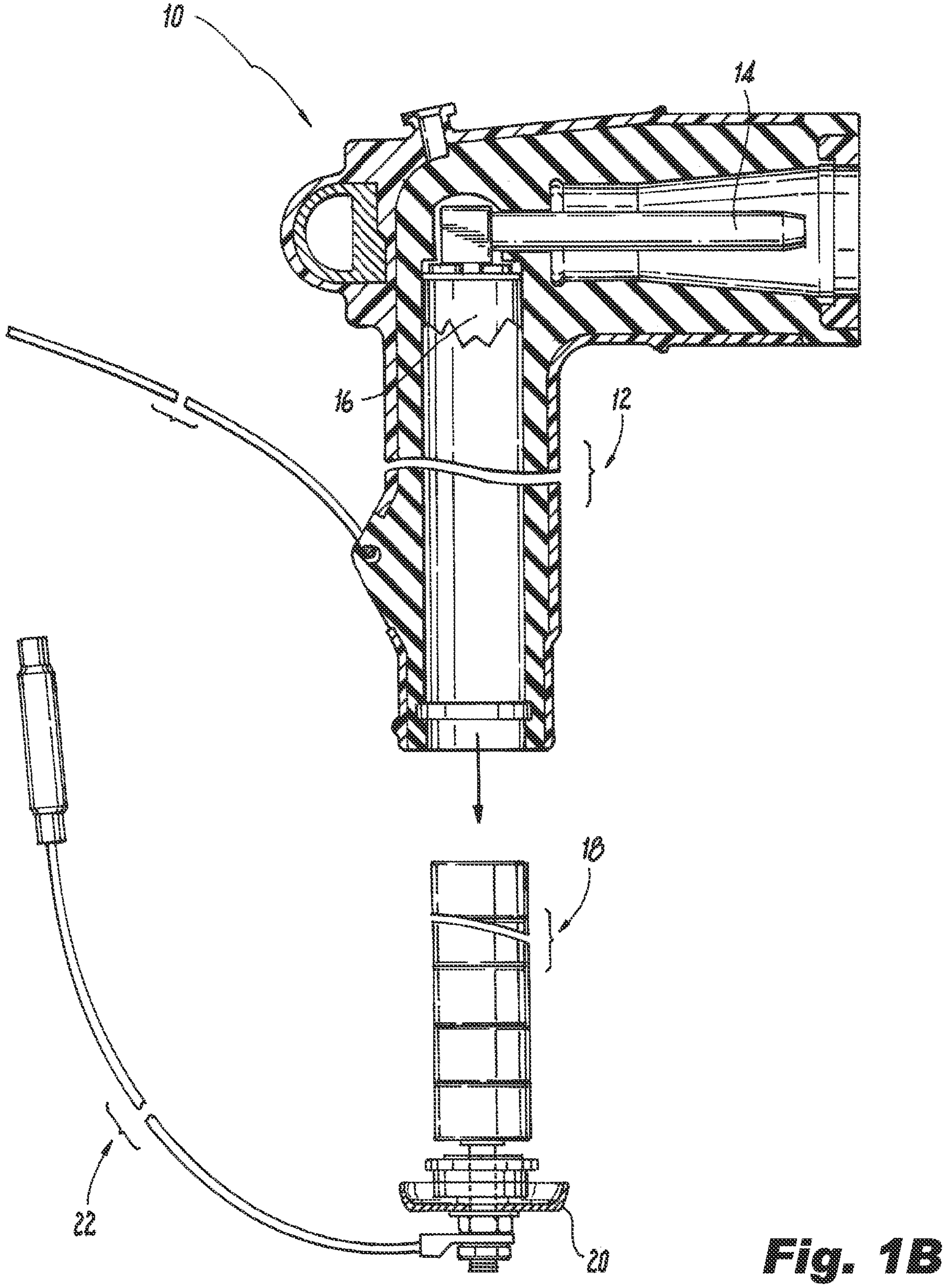
FIG. 1B illustrates a cross-sectional side view of a surge arrester of FIG. 1A after operation of a disconnecting device, according to some embodiments.

FIG. 1B provides an example of the surge arrester 10 following operation of the disconnector device 16. As shown, when the disconnector device 16 operates to separate from the housing 12 of the surge arrester 10, the MOV stack 18 and the bottom ground side connection 20 also separate from the housing 12. The connection providing current flowing from the terminal 14 to the system ground 22 is broken, and current cannot flow through the surge arrester 10. In some embodiments, the MOV stack 18 is only partially removed from the housing 12. In this embodiment, however, the current flow is still stopped.

Figure 2A:
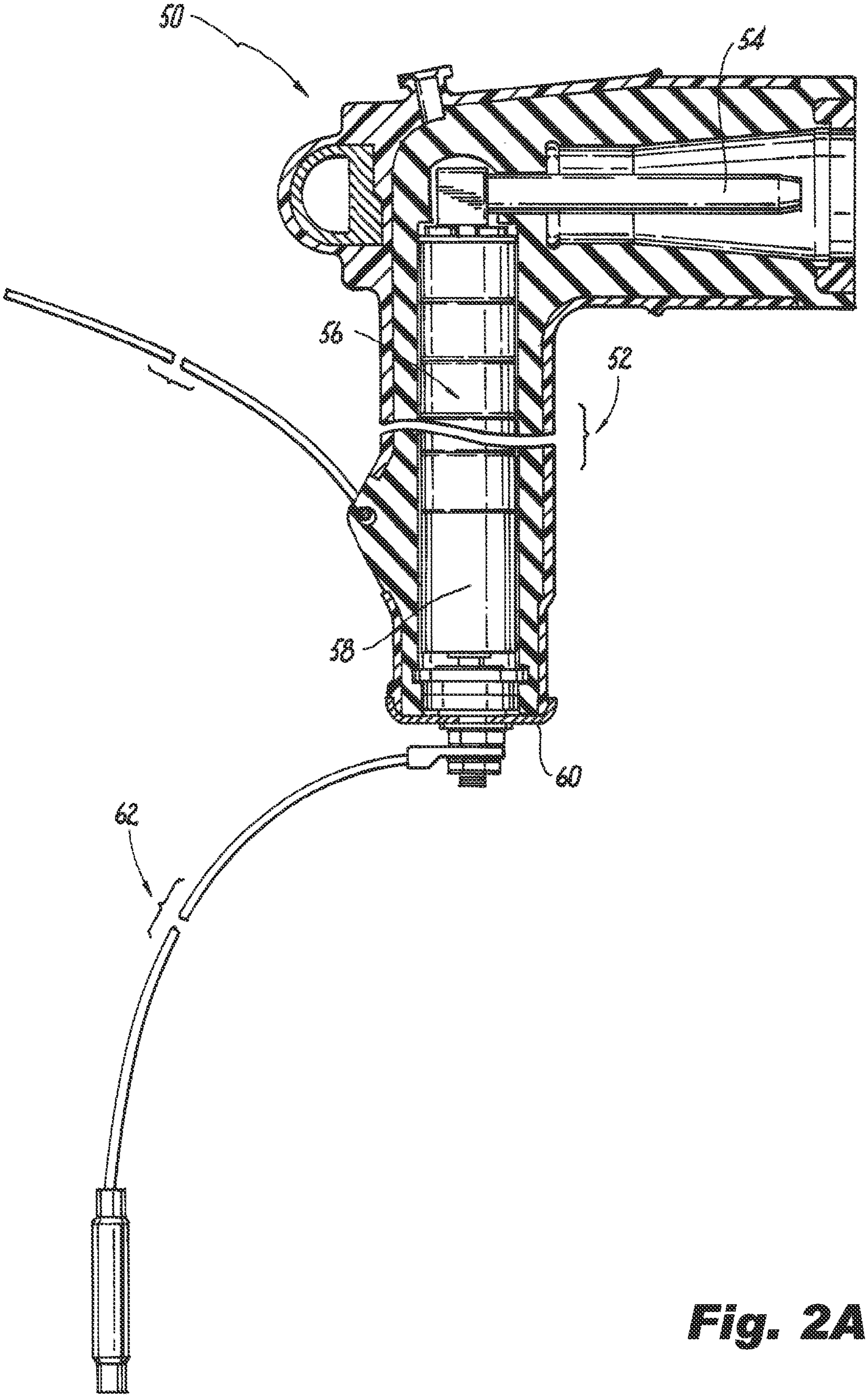
FIG. 2A illustrates a cross-sectional side view of a surge arrester according to some embodiments.
Figure 2B:
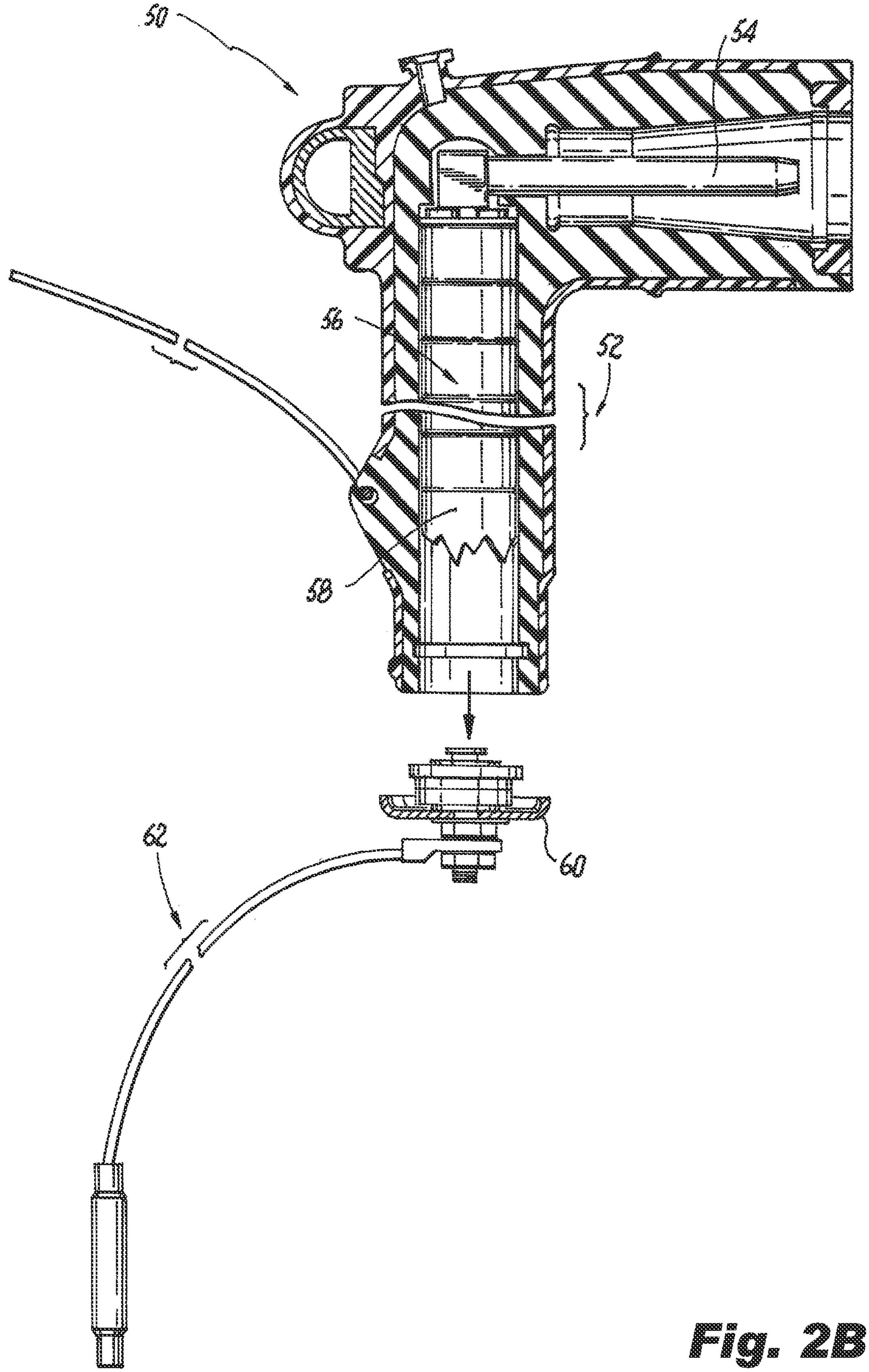
FIG. 2B illustrates a cross-sectional side view of a surge arrester of FIG. 2A after operation of a disconnecting device, according to some embodiments.

FIG. 2A provides a surge arrester 50 similar to that of surge arrester 10 of FIG. 1A. Surge arrester 50 includes a housing 52, a terminal 54, an MOV stack 56, a disconnector device 58, and a bottom ground side connection 60 coupled to a system ground 62. The disconnector device 58 is coupled between the MOV stack 56 and the bottom ground side connection 60. FIG. 2B provides an example of the surge arrester 50 following operation of the disconnector device 58, as detailed above. When the disconnector device 58 operates to separate from the housing 52 of the surge arrester 50, the bottom ground side connection 60 also disconnects from the housing 12. As such, the connection from the terminal 54 to system ground 62 is broken, and current cannot flow through the surge arrester 50.

Figure 3A:
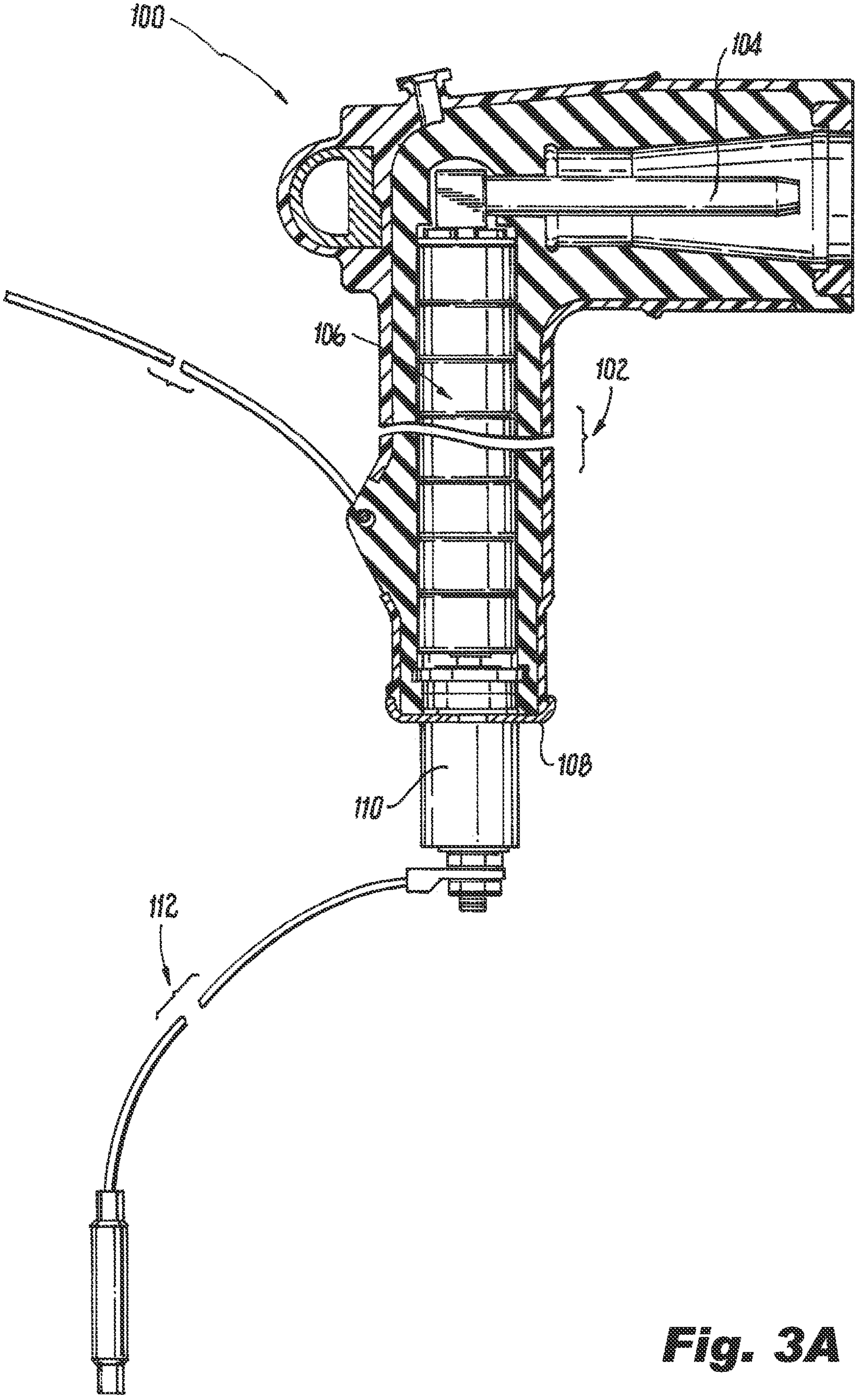
FIG. 3A illustrates a cross-sectional side view of a surge arrester according to some embodiments.
Figure 3B:
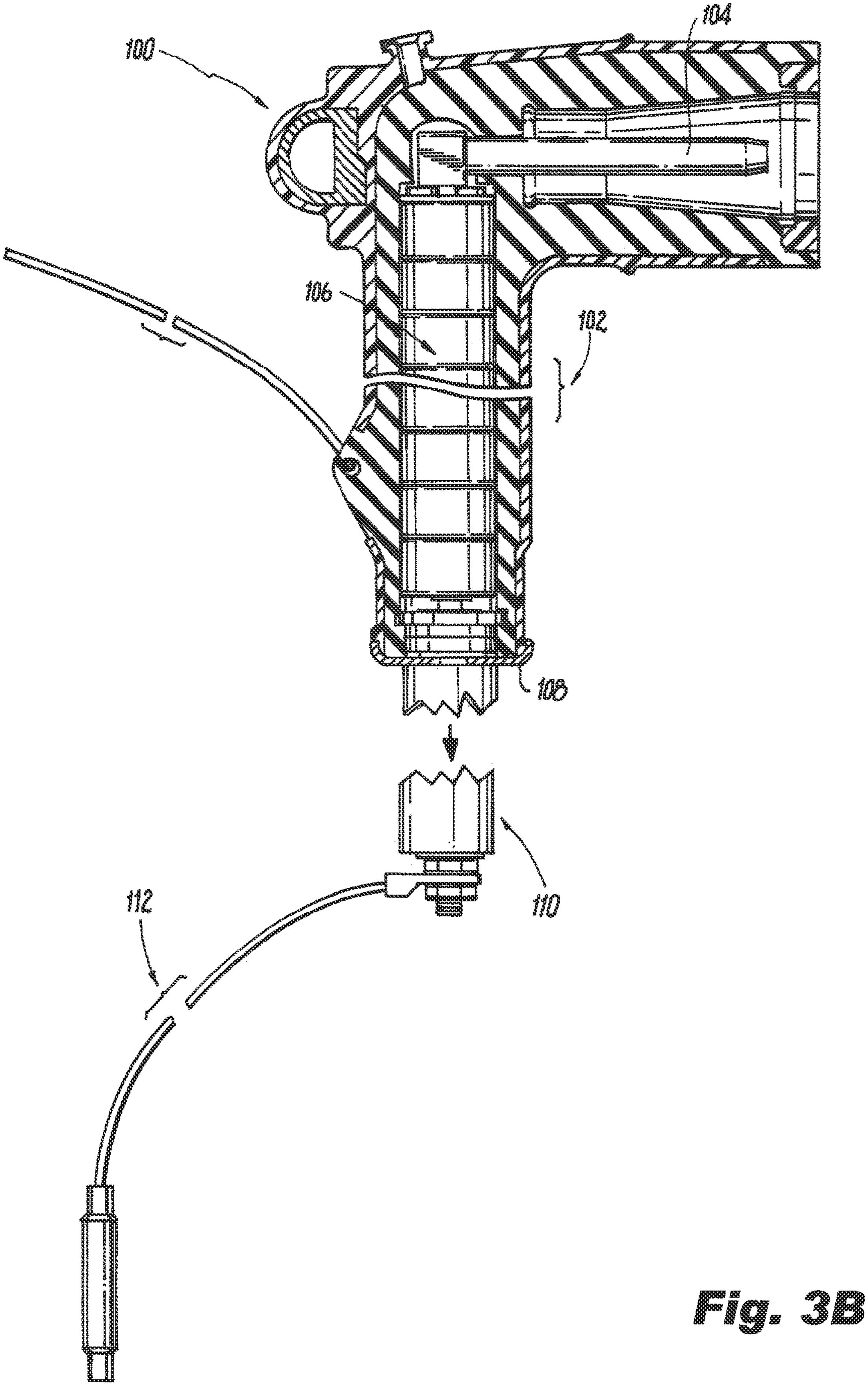
FIG. 3B illustrates a cross-sectional side view of a surge arrester of FIG. 3A after operation of a disconnecting device, according to some embodiments.

FIG. 3A provides a surge arrester 100 similar to that of surge arrester 10 of FIG. 1A. Surge arrester 100 includes a housing 102, a terminal 104, an MOV stack 106, a bottom ground side connection 108, and a disconnector device 110 coupled to a system ground 112. The disconnector device 110 is coupled to the bottom of the bottom ground side connection 108 and is situated directly below the housing 102. FIG. 3B provides an example of the surge arrester 100 following operation of the disconnector device 110, as detailed above. When the disconnector device 110 operates to separate from the housing 102, the connection with the system ground 112 is broken, and current cannot flow through the surge arrester 100.

Thus, the application provides, among other things, a disconnector device for use with a surge arrester. Various features and advantages of the application are set forth in the following claims.

What is claimed is:

1. A surge arrester comprising:
- a housing;
- a connecting interface configured to connect to an electrical power grid;
- a metal oxide varistor stack situated within the housing and configured to connect to a system ground; and
- a disconnector device coupled between the connecting interface and the metal oxide varistor stack;
- wherein the disconnector device is configured to partially eject the metal oxide varistor stack from the housing based on a predetermined disconnection condition.

2. The surge arrester of claim 1, wherein a complete electrical connection is formed from the connecting interface to the system ground.

3. The surge arrester of claim 1, wherein a resistance of the metal oxide varistor stack varies based on a voltage of the connecting interface.

4. The surge arrester of claim 1, wherein the disconnector device at least partially ejects the metal oxide varistor stack from the housing by igniting a cartridge containing gunpowder.

5. The surge arrester of claim 1, wherein the housing is composed of an insulating material having a conductive layer.

6. The surge arrester of claim 1, wherein the predetermined disconnection condition is a predetermined current threshold, and wherein the disconnector device at least partially ejects the metal oxide varistor stack upon a current flowing through the surge arrester reaching the predetermined current threshold.

7. The surge arrester of claim 1, wherein, when the metal oxide varistor stack is at least partially ejected from the housing, the metal oxide varistor stack is electrically disconnected from the electrical power grid.

8. A surge arrester comprising:
- a housing;
- a connecting interface configured to connect to an electrical power grid;
- a disconnector device coupled between the connecting interface and a metal oxide varistor stack; and
- a ground side connection coupled to the metal oxide varistor stack, the ground side connection configured to connect to a system ground,
- wherein the disconnector device is configured to at least partially eject the metal oxide varistor stack from the housing based on a predetermined disconnection condition.

9. The surge arrestor of claim 8, wherein a complete electrical connection is formed from the connecting interface to the ground side connection when the ground side connection is connected to the system ground.

10. The surge arrester of claim 8, wherein the housing is composed of an insulating material.

11. The surge arrester of claim 8, wherein a resistance of the metal oxide varistor stack varies based on a voltage of the connecting interface.

12. The surge arrester of claim 11, wherein the resistance of the metal oxide varistor stack decreases as the voltage of the connecting interface increases.

13. The surge arrester of claim 8, wherein the predetermined disconnection condition is a predetermined current threshold, and wherein the disconnector device at least partially ejects the metal oxide varistor stack upon a current flowing through the surge arrester reaching the predetermined current threshold.

14. A surge arrester comprising:
- a housing;
- a connecting interface configured to connect to an electrical power grid;
- a metal oxide varistor stack situated within the housing and configured to connect to a system ground;
- a disconnector device coupled between the connecting interface and the metal oxide varistor stack; and
- a ground side connection coupled to the metal oxide varistor stack, the ground side connection configured to connect to a system ground,
- wherein the disconnector device is configured to at least partially eject the metal oxide varistor stack from the housing based on a predetermined disconnection condition.

15. The surge arrester of claim 14, wherein a complete electrical connection is formed from the connecting interface to the system ground.

16. The surge arrester of claim 14, wherein a resistance of the metal oxide varistor stack varies based on a voltage of the connecting interface.

17. The surge arrester of claim 14, wherein the disconnector device at least partially ejects the metal oxide varistor stack from the housing by igniting a cartridge containing gunpowder.

18. The surge arrester of claim 14, wherein the housing is composed of an insulating material having a conductive layer.

19. The surge arrester of claim 14, wherein the predetermined disconnection condition is a predetermined current threshold, and wherein the disconnector device at least partially ejects the metal oxide varistor stack upon a current flowing through the surge arrester reaching the predetermined current threshold.

20. The surge arrester of claim 14, wherein, when the metal oxide varistor stack is at least partially ejected from the housing, the metal oxide varistor stack is electrically disconnected from the electrical power grid.

* * * * *